Patented Mar. 3, 1942

2,274,633

UNITED STATES PATENT OFFICE 2,274,633

CATALYTICALLY TREATING HYDROCARBONS

Edgar C. Pitzer, Chicago, Ill., and Llewellyn Heard, Hammond, Ind., assignors to Standard Oil Company, Chicago, Ill., a corporation of Indiana No Drawing. Application February 21, 1940, Serial No. 320,158

13 Claims. (Cl. 196—50)

This invention relates to the conversion of hydrocarbon oils and more particularly to the dehydrogenation and reforming of low knock rating motor fuels by treatment of the vapors at high temperature with catalysts. The invention relates specifically to the use of an improved catalyst prepared from aluminum and containing a promoting element. It also relates to methods of making such catalysts.

One object of the invention is to reform or aromatize straight run or virgin gasoline and naphtha, particularly heavy naphtha, by treatment with our improved catalyst, whereby gasoline is obtained with increased knock rating as indicated by the increase in the octane number. Another object of the invention is to reform naphthas with our improved catalyst and thereby produce a higher yield of gas per unit of carbon produced in the process. Still another object of the invention is to produce a cracking and reforming catalyst of high activity at a lower cost than catalysts heretofore used.

In preparing our catalyst we treat finely divided metallic aluminum which has been amalgamated, with a dilute acid solution containing dissolved therein a compound of a promoter element which may be copper, manganese or a metal selected from groups V, VI and VIII of the Periodic System (Mendelejeff), especially vanadium, chromium or molybdenum. The promoters which we employ are polyvalent metals of variable valence and we prefer to use those soluble compounds of the promoter metals in which the metal is present in one of its higher states of oxidation or valence. Reduction of the promoter occurs during the preparation of the catalyst, resulting in the formation of a colloidal sol or gel of the promoter metal or oxide, the dimensions of the promoter particles being commensurate with the dimensions of the alumina particles produced by the action of the acid on the metallic aluminum. We prefer to employ weak acids such as acetic acid and formic acid which form hydrolyzable salts with the aluminum. The use of strong acids results in aluminum salts which are too stable to hydrolyze without the addition of alkaline substances, such as ammonia, which produce a different form of alumina of much lower catalytic activity.

As an example of the method of making our catalyst, a 10% solution of chromic acid is added slowly to an excess of aluminum amalgam in vigorously stirred 1% acetic acid, six mols of acetic acid being provided per mole of chromic acid. Upon completion of the reaction, the solution is evaporated to dryness and heated cautiously to expel organic matter. A black, gel-like residue is obtained, approximately $Cr_2O_3:Al_2O_3$, the chromia and alumina being present in 1:1 molar ratio. The mol ratio of promoter oxide to alumina may vary, for example between 1:10 and 2:1. In a specific example, 2 g. $CrO_3$ was added slowly to 660 cc. 1% $CH_3COOH$ and excess Al amalgam at 130° F., with constant stirring. The solution was evaporated on the steam bath, the resulting black gel heated over a Bunsen burner, and the final residue was found to weigh 3.5 g.

The promoter may be added in the form of its water-soluble salts, for example, chromic nitrate, molybdic sulfate, cobaltic chloride, etc. However, we prefer to use those compounds of the promoter metals in which the metal is present in the anion, for example, as in chromic acid, molybdic acid, potassium permanganate, sodium vanadate, ammonium chromate, etc. Where alkali metal salts are used, such as sodium molybdate, it is important to wash the alkali metal from the catalyst in order to obtain satisfactory catalytic activity and catalyst life. This washing operation may be omitted or minimized by the use of ammonium salts or the use of the free acids such as molybdic acid. Washing is sometimes made difficult because of the peptizing action of water on the alumina hydrogel and if the salts are not carefully washed from the catalyst the latter is mechanically weak when dried. It is generally undesirable to employ reagents containing sulfate and chloride ions as these interfere with the gelation of the alumina. Amalgamated aluminum may be prepared readily by treating granulated or powdered aluminum metal with a small amount of a mercury salt in the presence of an acid.

The data in the following table illustrate the results obtained with our catalyst in reforming a heavy naphtha known as "mineral spirits" having an A. P. I. gravity of 48.9 and a distillation range of 300° F. initial to 400° F. end point. The mineral spirit (naphtha) was vaporized and the vapors passed at a temperature of 890 to 900° F. through the catalyst. The rate of treatment was one volume of naphtha per gross volume of catalyst per hour. (Space velocity=1.) The duration of the tests was 5 hours. The catalyst was made in the following manner: To a dilute solution of acetic acid, in which an excess of amalgamated aluminum was vigorously stirred, chromic acid was added in successive small portions until substantially complete reaction takes place according to the equation:

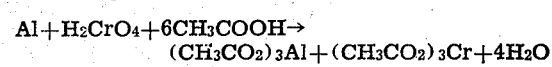

The solution is decanted from mercury and any residual particles of metallic aluminum and evaporated to dryness on the steam bath, then heated slowly to 1000° F. A black, lustrous, granular gel remains.

Data are also given showing the results obtained with an alumina-chromia catalyst made by the usual method of mixing a solution of aluminum nitrate and ammonium chromate with ammonium hydroxide gives a catalyst in which the ratio of alumina to chromia was about 9 to 1.

*Catalytic reforming—mineral spirits*

|  | Amalgamated alumina-chromia gel catalyst | Ordinary alumina-chromia catalyst |
| --- | --- | --- |
| Temperature °F | 890–900 | 890–900 |
| Duration of run hours | 5 | 5 |
| Yield of gasoline based on naphtha charged percent | 88.4 | 92 |
| Knock rating of gasoline, A. S. T. M | 51 | 47.5 |
| Knock rating of naphtha charged, A. S. T. M | 27.5 | 27.5 |
| Increase in knock rating | 23.5 | 20 |
| Gas produced: | | |
| Total liters | 34.06 | 27.75 |
| Percent of gas (by weight) | 3.1 | 2.65 |
| Molecular weight of gas | 3.84 | 3.9 |
| Carbon produced percent | 1.5 |  |

It will be seen from the foregoing data that the activity of the co-gelled catalyst from amalgamated aluminum is considerably greater than that of the catalyst made by the usual method. This is indicated not only by the greater increase in knock rating of gasoline obtained but also by the increase in the gas production.

In the treatment of naphthas and gasoline, we prefer to add hydrogen to the hydrocarbon vapors treated, the amount of hydrogen being ordinarily about 1 to 5 mols of hydrogen per mol of hydrocarbon. Hydrogenous gases, such as cycle gases from the operation, may be used. These usually contain about 40 to 60% of hydrogen. The pressure may be about atmospheric to 450 pounds per square inch, preferably about 50 to 300 pounds per square inch and the temperature may suitably be within the range of about 850 to 900° F. minimum and 1000 to 1075° F. maximum, preferably about 950 to 975° F. The rate of contacting (space velocity) may suitably be about 0.1 to 10 volumes of naphtha per gross volume of catalyst per hour. A space velocity of about 1 to 2 is generally satisfactory.

Having thus described our invention, what we claim is:

1. The method of converting hydrocarbon oils which comprises vaporizing the oils and subjecting the vapors at conversion temperatures to the action of a catalyst made by treating amalgamated aluminum with a weak acid and a solution of a salt of a promoting metal having a variable valence, continuing the treating until the aluminum is dissolved and the promoting metal forms a hydrated oxide, allowing the solution to gel and thereafter heating and drying the resulting hydrogel to produce the desired catalyst.

2. The method of converting hydrocarbon oils which comprises vaporizing the oils and subjecting the vapors at conversion temperatures to the action of a catalyst made by treating amalgamated aluminum with a weak acid and a solution of a salt of a promoting metal of Group VI of the Periodic System including chromium and molybdenum, continuing the treating until the aluminum is dissolved in the form of a colloidal sol, allowing the solution containing the hydrated oxides of aluminum and the promoting metal to gel, and thereafter drying the gel to produce the desired catalyst.

3. The method of claim 2 wherein the promoting metal is chromium.

4. The method of claim 2 wherein the promoting metal is molybdenum.

5. The method of increasing the knock rating of low knock rating naphtha which comprises vaporizing said naphtha and subjecting the vapors at a temperature of about 850 to 1075° F. in the presence of hydrogen to the action of an alumina gel catalyst prepared by treating amalgamated aluminum with a solution of a promoting metal having a variable valence and a weak acid whose aluminum salt is hydrolyzed by water, continuing the treating to coagulate said aluminum oxide to produce a gel containing as a promoter a hydrated oxide of said promoting metal, and drying the resulting product.

6. The process of claim 5 wherein the promoting metal is employed in the form of a water-soluble compound in which the metal is present in a higher state of oxidation.

7. The method of claim 5 wherein the promoting metal is employed in the form of a water-soluble compound in which the metal is present in the anion.

8. The method of converting hydrocarbon oils which comprises vaporizing the oils and subjecting the vapors at conversion temperatures to the action of a promoted aluminum oxide hydrocarbon conversion catalyst made by forming a colloidal solution of aluminum oxide by treating amalgamated aluminum with a dilute solution of a weak acid containing a compound of a group VI metal, heating the resulting solution to coagulate said aluminum oxide to produce a gel containing as a promoter a hydrated oxide of said group VI metal, and drying the resulting product.

9. The method of claim 8 wherein the group VI promoting metal is chromium.

10. The method of claim 8 wherein the group VI promoting metal is molybdenum.

11. The method of making a hydrocarbon conversion catalyst which comprises treating amalgamated aluminum with a dilute solution of acetic acid containing chromic acid, heating the resulting solution and drying the product.

12. The method of claim 11 wherein the amount of chromic acid employed is molecularly equal to the amount of aluminum treated.

13. The method of making a hydrocarbon conversion catalyst which comprises preparing a colloidal solution of aluminum oxide and chromium oxide by treating amalgamated aluminum with a chromic salt in the presence of a weak acid readily vaporizable, heating the resulting solution to expel said weak acid and coagulate said colloidal solution, and drying the resulting coagulated hydrogel.

EDGAR C. PITZER.
LLEWELLYN HEARD.